UNITED STATES PATENT OFFICE.

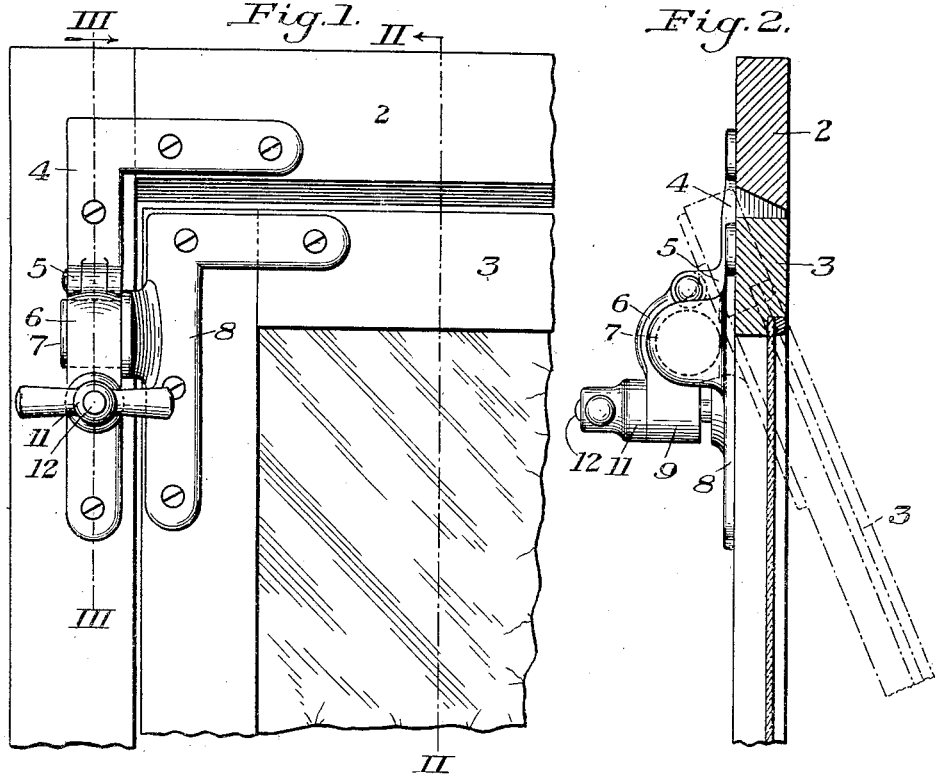
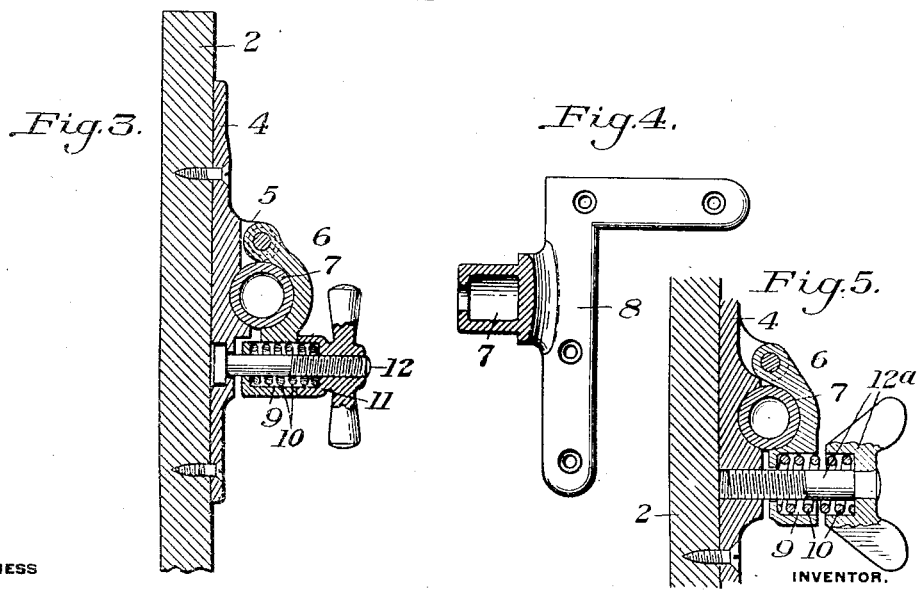

JOSEPH ERRET, OF CLEVELAND, OHIO.

WINDSHIELD-HOLDER.

1,338,004.   Specification of Letters Patent.   Patented Apr. 27, 1920.

Application filed August 16, 1919. Serial No. 317,999.

*To all whom it may concern:*

Be it known that I, JOSEPH ERRET, residing at Cleveland, Cuyahoga county, Ohio, have invented a new and useful improvement in Windshield-Holders, of which the following is a full, clear, and exact description, reference being had to the accompanying drawings, forming part of this specification, in which—

Figure 1 is an elevation of a portion of a wind shield having my invention applied thereto;

Figs. 2 and 3 are sectional views taken on the lines II—II and III—III, respectively, of Fig. 1, and looking in the directions indicated by the arrows in said figure;

Fig. 4 is a detail view of one of the trunnion plates; and

Fig. 5 is a view similar to Fig. 3, but showing a modification.

My invention has relation to wind shield holders, and is designed to provide a holder which is especially adapted for the purpose of securely holding heavy wind shields, such as are used on auto trucks, in any desired position, spring-clamping means of novel character being provided which will prevent the wind-shield from dropping and breaking.

The nature of my invention will be best understood by reference to the accompanying drawings, in which I have shown the preferred embodiment thereof, and which will now be described, it being premised, however, that various changes may be made in the details of construction and arrangement of the various parts, without departing from the spirit and scope of my invention, as defined in the appended claim.

In the accompanying drawings, the numeral 2 designates the usual supporting frame for a wind shield, and 3 the wind shield frame. 4 is an L-shaped plate or bracket which is secured to the frame 2 at its upper corner portion. Although I have illustrated but one end of the wind shield, it will be understood that a similar construction is employed at both ends. The vertical arm of the bracket 4 is provided with lugs 5, between which is hinged the upper end of a clamp member 6, which is so shaped in connection with the outer face of the bracket, as to form a bearing for the trunnion 7 of the trunnion plate 8, secured to the wind shield 3. The lower portion of the member 6 is formed with a spring pocket 9, which seats one end portion of a coiled spring 10, the other end portion being seated within the pocket portion of a clamping nut 11. 12 is a bolt having its head secured in bracket 4, and which projects through the spring, its outer end portion being threaded to engage the nut 11.

The spring 10 exerts a constant pressure on the clamping member 6, to cause the same to clamp and securely hold the trunnion 7. By loosening or tightening the nut 11, the wind shield may be placed and held securely in any desired position when in use on the vehicle. It is held in the adjusted position by the action of the clamp in a manner to prevent its shaking loose and dropping, and thus avoiding the danger of breakage.

It may be desirable to provide for the ready removal of the wind shield 3 from the frame 2; and for this purpose, instead of the bolt 12 and nut 11, I may employ a thumb-screw 12ª, as shown in Fig. 5. This can be readily screwed out and the wind shield frame can then be quickly removed.

It will be understood that while I have particularly described my invention in connection with wind shield holders, it may be used for other purposes such as holding pivoted window sashes and the like.

I claim:

In devices for holding wind shields and the like, a pair of L-shaped plates having attachment holes by which they may be secured one to one face of the wind shield frame or other movable member and the other to one face of a relatively fixed frame at the corners thereof, in general parallel position to each other, one of the parallel members having a laterally projecting trunnion at an intermediate portion of its length projecting across the intermediate portion of the parallel leg of the other member, the other member having a bearing for said trunnion provided with a swinging clamping member, the clamping member having a spring pocket and a clamping bolt arranged to act upon the spring, substantially as described.

In testimony whereof I have hereunto set my hand.

JOSEPH ERRET.